United States Patent Office 3,444,231
Patented May 13, 1969

3,444,231
PROCESS FOR THE PREPARATION OF ISOCYA-
NATES AND ISOTHIOCYANATES
Walter Merz, Leverkusen, Germany, assignor to Farben-
fabriken Bayer Aktiengesellschaft, Leverkusen, Ger-
many, a corporation of Germany
No Drawing. Filed Feb. 1, 1966, Ser. No. 523,846
Claims priority, application Germany, Feb. 2, 1965,
F 45,123
Int. Cl. C07c 119/04, 161/04
U.S. Cl. 260—453                                6 Claims

ABSTRACT OF THE DISCLOSURE

Isocyanates and isothiocyanates are prepared by a process which comprises reacting a monofunctional isocyanate or a monofunctional isothiocyanate with a substituted azomethine at an elevated temperature.

This invention relates to the preparation of isocyanates and isothiocyanates and more specifically to the preparation of isocyanates and isothiocyanates which were not readily accessible heretofore.

Many isocyanates which could have great commercial value have not been developed industrially because they are either inaccessible or accessible only with great difficulty. As a corollary, the isocyanates which fall into this category are generally prohibitively expensive with the result that their use and development is impeded or even precluded.

It is therefore an object of this invention to provide a method for the preparation of heretofore inaccessible isocyanates and isothiocyanates.

It is a further object of this invention to provide a simple and expedient method for the preparation of isocyanates and isothiocyanates in good yields which were heretofore unobtainable or only obtainable with difficulty.

The foregoing objects and others which will become apparent from the following description are accomplished in accordance with this invention, generally speaking, by providing a process for the production of isocyanates by the reaction between a substituted azomethine or methylenimine and monofunctional organic isocyanate or isothiocyanate at an elevated temperature. In this reaction the radical attached to the NCO group is exchanged for the radical substituted on the nitrogen atom of the methylenimine group in an interchange reaction as illustrated in the following equation:

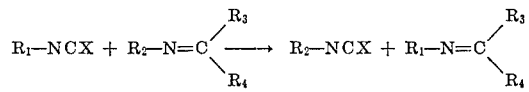

wherein X is oxygen or sulphur; $R_1$ and $R_4$ are the same or different radicals and may be any suitable alkyl radical having from seven to twenty carbon atoms, and any suitable ω-chloroalkyl or cycloalkyl radical having from six to seven carbon atoms and corresponding alkyl substituted modifications of the foregoing wherein the substituent has from one to eight carbon atoms in the chain, benzyl, phenyl or naphthyl radicals which may or may not be substituted with chlorine, fluorine, alkoxyl groups having from one to four carbon atoms, alkyl groups having from one to six carbon atoms or a nitro group; $R_2$ represents a straight chained, branched, saturated or unsaturated alkyl radical having from one to six carbon atoms, which may or may not be substituted by alkoxy or alkylmercapto groups having from one to four carbon atoms, dialkylamino groups having from one to six carbon atoms, fluorine, chlorine or bromine atoms, perfluoroalkyl groups having one or two carbon atoms or phenyl radical which may be substituted with alkyl groups having from one to eight carbon atoms, a halogen atom such as fluorine, chlorine, and bromine, alkoxy groups having from one to four carbon atoms, or a cycloalkyl radical having five to eight carbon atoms in the ring system, but $R_2$ cannot have the same meaning as $R_1$; $R_3$ is hydrogen, an alkyl group having one to six carbon atoms or a phenyl group.

The isocyanate starting material may be any suitable organic isocyanate but is preferably an inexpensive, commercially easily accessible mono functional isocyanate and/or isothiocyanate. Some such suitable isocyanate and/or isothiocyanate materials are, for example, heptyl-, ω-chloroheptyl, 3-methyl - ω - chloroheptyl, cyclohexyl-, methylcyclohexyl, 2,4-dimethylcyclohexyl-, 4-tert.-butyl-cyclohexyl-, 4-isoctylcyclohexy-, stearyl-, phenyl-, 4-chlorophenyl-, 2-chlorophenyl-, 4-fluorophenyl-, 3,4-dichlorophenyl-, trichlorophenyl-, 4-methoxyphenyl-, 4-butoxyphenyl-, 2- or 4-nitrophenyl-, tolyl, 2,4-diethyl-phenyl, 4-hexylphenyl-, a- or b-naphthyl-, benzyl-, 4-chlorobenzyl-, 2-chlorobenzyl-, 2- or 4-fluorobenzyl-, 4-ethoxybenzyl-, or 4-nitrobenzyl-, 2-methylbenzyl-, 2,4-dimethylbenzyl-, 2-chloronaphthyl-, 4-fluoronaphthyl-, 2-propoxynaphthyl-, 2-nitronaphthyl-, 4-butylnaphthyl-, isocyanate and/or -isothiocyanate and the like and mixtures thereof.

Any suitable azomethine may be used, but preferably azomethines which are reaction products of aldehydes having the above enumerated substituents, with the corresponding primary amines are used. Some such suitable preferred azomethines which can be used, are, for example, methylbenzalimine,
ethylbenzalimine,
n-propylbenzalimine,
isopropylbenzalimine,
n-butylbenzalimine,
isotbutylbenzalimine,
amylbenzalimine,
hexylbenzalimine,
cyclohexylbenzalimine,
cycloheptylbenzalimine,
dimethylaminobenzalimine,
dihexylaminobenzalimine,
cyclooctylbenzalimine,
b-chloroethylbenzalimine,
b- or g-chloropropylbenzalimine,
b-bromoethylbenzalimine,
b-fluoroethylbenzalimine,
methoxy- or ethoxy-ethylbenzalimine,
g-ethoxypropylbenzalimine,
b-methyl-mercaptoethylbenzalimine,
(2,2,2-trifluoroethyl)-benzalimine,
alkylbenzalimine,
crotylbenzalimine,
propargylbenzalimine,
phenylbenzalimine,
methyl-(3- or 4-methoxybenzal)-imine,
methyl-(3- or 4-chlorobenzal)-imine, methyl-(2,4-dichlorobenzal)-imine,
methyl-(3-nitrobenzal)-imine,
methyl-benzophenone-imine, and corresponding azomethines based on ethyl-, n-propyl-, isopropyl-, n-butyl-, isobutyl-, amyl-, allyl-, crotyl- or propargylamine and the like and mixtures thereof.

The isocyanates or isothiocyanates used as starting materials can be reacted with the azomethines in a molar ratio of up to about 3:1, and preferably about 1.0 to 1.5:1, although an excess of azomethine to isocyanate may also be used. If desired, the interchange reaction may be carried out in the presence of a high boiling inert solvent. Any suitable high boiling inert solvent may be used such as, for example, chlorinated hydrocarbons such as di- or trichlorobenzene, chlorinated naphthalene, ethers such as diphenylether, chlorinated diphenyls, esters such as phthalic acid dibutyl ester and the like and mixtures thereof. The solvent used should have a boiling point higher than that of the isocyanate being prepared.

The starting materials are preferably so chosen that the isocyanate or isothiocyanate formed during the reaction has the lowest boiling point. The reaction temperature is between about 80° and about 400° C., but preferably between about 130° to about 320° C.

In a preferred embodiment of this invention, the mixture of starting materials is heated under a reflux condenser supplied with a cooling liquid, the temperature of which is above the boiling point of the desired isocyanate or isothiocyanate but below the boiling point of the other components of the reaction mixture. Where a higher boiling isocyanate or isothiocyanate is to be prepared, it may be necessary to work under a reduced pressure of up to about 1 mm. Hg.

The isocyanates and/or isothiocyanates formed in the interchange reaction are separated by distillation, possibly with the use of a distillation column. The new azomethine formed as by-product of the reaction can be isolated and recovered by known methods and returned to the reaction mixture after suitable treatment. For example, the azomethine may be split hydrolytically with the isolation and recovery of the resulting components; the keto component may then be used for forming fresh azomethine and the amine may be used again for the production of the isocyanate. Alternatively, the azomethines formed, using phenylbenzylamine as an example, may be reacted at elevated temperatures of about 180° to 300° C. with primary amines, using methylamine as an example, wherein the amine radical is exchanged and, in the examples mentioned, methylbenzylamine and aniline are obtained in a quantitative yield. Whichever mode of treatment is chosen, it is clear that the process of this invention can be carried out continuously as well as batchwise.

The new process enables isocyanates and isothiocyanates to be prepared in good yields but in particular it is also possible by this process to prepare those isocyanates which cannot be prepared by known methods or only with difficulty.

The invention is further illustrated but is not intended to be limited by the following examples in which all parts and percentages are by weight unless otherwise specified.

EXAMPLE 1

About 357 parts (about 3.0 moles of methyl benzalimine and about 357 parts (about 3.0 mols) of phenylisocyanate are admixed and the temperature rises to about 135° C. The mixture is heated under a small reflux condenser which is supplied with water having a temperature of about 60° C. The vapors which escape from the reflux condenser are condensed and trapped in an ice-cooled receptacle. Methyl-isocyanate begins to split off at a sump temperature of about 160° C. and continues to split off up to a temperature of about 300° C. After renewed distillation of the crude product (about 162 parts), about 154 parts (about 90% of the theoretical amount) of pure methyl isocyanate is obtained having a boiling point of about 39° C. at atmospheric pressure. Vacuum distillation of the residue of the reaction mixture yields about 30 parts (about 8.5% of theoretical) of unreacted phenyl isocyanate. The remaining residue yields, on recrystallization from alcohol, about 455 parts (about 84% of theoretical) of benzal aniline.

In the following examples, the apparatus used is similar to that employed above.

EXAMPLE 2

About 119 parts (about 1 mol) of methyl benzalimine are treated with about 184 parts (about 1.2 mols) of 3-chlorophenyl isocyanate, and the temperature rises to about 125° C. On heating, about 52 parts of the crude product distills over between about 150° C. and about 320° C. Renewed distillation yields about 51.5 parts (about 90.5% of theoretical) of pure methyl isocyanate.

EXAMPLE 3

A mixture of about 119 parts (about 1 mol) of methyl benzalimine and about 230 parts (about 1.5 mols) of 4-chlorophenyl isocyanate (temperature rises to about 116° C. when the two components are brought together) is heated. Between about 176° C. and about 240° C., about 49 parts (86% of theoretical) of methyl isocyanate are split off. About 52 parts of unreacted 4-chlorophenyl isocyanate and about 195 parts (about 90.5% of theoretical) of 4-chlorophenyl-benzalimine are isolated from the residue.

EXAMPLE 4

About 226 parts (about 1.2 mols) of 3,4-dichlorophenyl isocyanate are placed in a reaction vessel. When about 119 parts (about 1 mol) of methyl benzalimine are added, the temperature rises to about 125° C. The mixture is heated under a reflux condenser (water temperature about 50° C.) to about 230° to about 320° C. Pure methyl isocyanate is obtained in a yield of about 53 parts (about 93% of theoretical).

EXAMPLE 5

When about 119 parts (about 1 mol) of methyl benzalimine are reacted with about 203 parts (about 1.2 mols) of α-naphthyl isocyanate in a temperature region of between about 210° to about 320° C., about 21 parts (about 37% of theoretical) of pure methyl isocyanate are obtained.

EXAMPLE 6

About 77 parts (0.5 mol) of methyl-(3-chlorobenzal)-imine are reacted with about 113 parts (about 0.6 mol) of 3,4-dichlorophenyl isocyanate at a temperature of about 220° to 330° C., about 17 parts (about 60% of theoretical) of crude methyl isocyanate are thus obtained.

EXAMPLE 7

The reaction of about 92 parts (about 0.6 mol) of methyl-(3-chlorobenzal)-imine with about 104 parts (about 0.65 mol) of α-napthyl isocyanate at a temperature of about 200° to about 300° C. yields about 16 parts (about 49% of theoretical) of crude methyl isocyanate having a boiling point of about 38° C.

EXAMPLE 8

About 97.5 parts (about 0.5 mol) of benzophenone methylimine are treated with about 36 parts of phenyl isocyanate and heated. A further about 36.5 parts of phenyl isocyanate (all together about 0.6 mol) are slowly added dropwise at the decomposition temperature of about 210° to about 300° C. About 15 parts (about 55% of theoretical) of methyl isocyanate are collected in the collecting vessel.

EXAMPLE 9

When about 735 parts (about 5.5 mols) of ethylbenzalimine and about 715 parts (about 6 mols) of phenyl isocyanate are mixed together, the temperature in the flask rises to about 113° C. The mixture is then heated and ethyl isocyanate begins to distill off at about 150° C. The temperature is increased to a sump temperature of about 280° C. About 384 parts of a colorless liquid are collected and on renewed distillation yield about 319 parts (about 81.5% of theoretical) of pure ethyl isocyanate having a boiling point of about 59° to about 62° C.

EXAMPLE 10

About 800 parts (about 6 mols) of ethyl benzalimine and about 1100 parts (about 7.2 mols) of 3-chlorophenyl isocyanate, when heated to about 170° to about 320° C., yield about 282 parts (about 66% of theoretical) of ethyl isocyanate and about 576 parts of (3-chlorophenyl)-benzalimine.

EXAMPLE 11

About 735 parts (about 5 mols) of isopropyl benzalimine and about 715 parts (about 6 mols) of phenyl isocyanate are heated. About 405 parts of a colorless liquid distill over at a sump temperature of between about 180° and about 260° C. Redistillation yields about 322 parts (about 76% of theoretical) of isopropyl isocyanate.

EXAMPLE 12

About 147 parts (about 1 mol) of isopropyl benzalimine are added to about 226 parts (about 1.2 mols) of 3,4-dichlorophenyl isocyanate (the temperature on mixing is about 34° C.). About 44 parts of a colorless liquid distill over at a sump temperature of about 212° to about 255° C. Redistillation yields about 34 parts (about 40% of theoretical) of isopropyl isocyanate having a boiling point of about 73° C.

EXAMPLE 13

When about 145 parts (about 1 mol) of allyl benzalimine and about 143 parts (about 1.2 mols) of phenyl isocyanate are brought together, the mixture heats up to about 60° C. When heat is applied and the reaction mixture reaches about 160° to about 280° C., about 42 parts of allyl isocyanate distill over. After renewed fractional distillation, about 32 parts (about 38.5% of theoretical) of pure product are left.

EXAMPLE 14

When about 725 parts (about 5 mols) of allyl benzalimine and about 920 parts (about 6 mols) of 3-chlorophenyl isocyanate are heated, about 173 parts of a colorless liquid distill over at about 200° to about 280° C. internal temperature. Redistillation yields about 111 parts (about 27% of theoretical) of allyl isocyanate.

EXAMPLE 15

When about 354 parts (about 1.2 mols) of stearyl isocyanate are heated with about 177 parts (about 1 mol) of 3-methoxypropyl benzalimine in vacuo, 3-methoxypropyl isocyanate begins to distill off at a sump temperature of about 145° to about 160° C. at a pressure of about 11 mm. Hg. A yield of about 64 parts (about 56% of theoretical) of pure product is obtained in the form of a colorless liquid having a boiling point of about 136° to about 140° C.

EXAMPLE 16

On heating about 177 parts (about 1 mol) of 3-methoxypropylbenzalimine and about 184 parts (about 1.2 mols) of 3-chlorophenyl isocyanate, 3-methoxypropyl isocyanate is split off at a sump temperature of about 200° to about 307° C. Redistillation of this product yields about 50 parts (about 43% of theoretical) of pure product.

EXAMPLE 17

A distillate of about 66 parts (about 55% of theoretical) of phenylisocyanate is obtained from a mixture of about 181 parts (about 1 mol) of benzaniline and about 354 parts (about 1.2 mols) of stearyl isocyanate at about 157° to about 330° C. at 20 mm. Hg.

EXAMPLE 18

About 181 parts (about 1 mol) of benzalimine and about 203 parts (about 1.2 mols) of α-naphthyl isocyanate are heated. About 44 parts (about 39% theoretical) of crude phenyl isocyanate distill over at a sump temperature of about 266° to about 321° C.

EXAMPLE 19

When about 119 parts (about 1 mol) of methyl benzalimine are heated together with about 182 parts (about 1.2 mols) of phenyl isothiocyanate, a colorless liquid begins to distill over at an internal temperature of about 180° C. to about 300° C. Renewed distillation of the crude product (about 74 parts) yields about 49.6 parts (about 68% of theoretical) of methyl isothiocyanate having a boiling point of about 119° C. to about 121° C. which rapidly crystallizes completely in the collector.

Although the invention has been described in considerable detail in the foregoing, it is to be understood that such detail is solely for the purpose of illustration and that many variations can be made by those skilled in the art without departing from the spirit and scope of the invention.

What is claimed is:

1. A process for a preparation of an isocyanate compound of the formula $R_2$—NCX which comprises reacting a monofunctional organic isocyanate of the formula $R_1$—NCX with a substituted azomethine of the formula

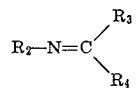

at a temperature of from about 80° C. to about 400° C., the reactants being chosen so that the isocyanate compound formed during the reaction has the lowest boiling point, wherein X is oxygen or sulphur; $R_1$ and $R_4$ are the same or different alkyl radicals having from seven to twenty carbons atoms, ω-chloroalkyl or cycloalkyl radicals having from six to seven carbon atoms and corresponding alkyl substituted modifications of the foregoing wherein the substituent is an alkyl radical having from one to eight carbon atoms; benzyl, phenyl or naphthyl radicals, any of which may in turn be substituted with chlorine, fluorine, alkoxyl groups having from one to four carbon atoms, alkyl groups having from one to six carbon atoms or a nitro group; $R_2$ is a saturated or unsaturated alkyl radical having from one to six carbon atoms which may be substituted by alkoxy or alkylmercapto groups having from one to four carbon atoms, dialkylamino groups having from one to six carbon atoms, fluorine, chlorine, or bromine atoms, perfluoroalkyl groups having one or two carbon atoms or a phenyl radical which may also be substituted with alkyl groups having from one to eight carbon atoms, fluorine, chlorine and bromine, alkoxy groups having from one to four carbon atoms or a cycloalkyl radical having five to eight carbon atoms in the ring system, $R_3$ is hydrogen, an alkyl group having one to six carbon atoms or a phenyl group, and wherein $R_1$ and $R_2$ do not have the same meaning.

2. The process of claim 1 wherein the reaction is carried out in the presence of an inert solvent having a boiling point higher than that of the isocyanate being prepared.

3. The process of claim 1 wherein the ratio of isocyanate or isothiocyanate to substituted azomethine is up to about 3:1.

4. The process of claim 1 wherein an excess of substituted azomethine is employed.

5. The process of claim 1 wherein the isocyanate being reacted with the substituted azomethine is a monofunctional organic isocyanate.

6. The process of claim 1 wherein the isothiocyanate being reacted with the substituted azomethine is a monofunctional organic isothiocyanate.

References Cited

UNITED STATES PATENTS 2,513,996   7/1950   Haury _____ 260—566
3,345,395   10/1967  Muller et al. _____ 260—453

OTHER REFERENCES

Lange: J. Am. Chem. Soc., vol. 48, pp. 2440–4 (1926).

CHARLES B. PARKER, *Primary Examiner.*

D. H. TORRENCE, *Assistant Examiner.*

U.S. Cl. X.R.

260—454, 566